United States Patent
Lord, III et al.

(10) Patent No.: US 9,447,336 B2
(45) Date of Patent: Sep. 20, 2016

(54) REMOVING MERCURY FROM CRUDE OIL USING A STABILIZER COLUMN

(71) Applicant: ConocoPhillips Company, Houston, TX (US)

(72) Inventors: Charles J. Lord, III, Bartlesville, OK (US); Thomas R. Smith, Aberdeen (GB); David O'Halloran, Middlesbrough (GB)

(73) Assignee: ConocoPhillips Company, Houston, TX (US)

( * ) Notice: Subject to any disclaimer, the term of this patent is extended or adjusted under 35 U.S.C. 154(b) by 20 days.

(21) Appl. No.: 14/459,710

(22) Filed: Aug. 14, 2014

(65) Prior Publication Data
US 2015/0108040 A1 Apr. 23, 2015

Related U.S. Application Data (60) Provisional application No. 61/892,035, filed on Oct. 17, 2013.

(51) Int. Cl.
- *C10G 31/06* (2006.01)
- *B01D 19/00* (2006.01)
- *C10G 29/00* (2006.01)
- *C10G 21/06* (2006.01)
- *C10G 21/14* (2006.01)

(52) U.S. Cl.
CPC ........... C10G 31/06 (2013.01); B01D 19/0015 (2013.01); *C10G 2300/205* (2013.01)

(58) Field of Classification Search
CPC ...... C10G 31/06; C10G 29/00; C10G 21/06; C10G 21/14; C10G 25/003; C10G 53/02; C10G 53/04; C10G 53/08
See application file for complete search history.

(56) References Cited

U.S. PATENT DOCUMENTS

| | | | |
|---|---|---|---|
| 3,194,629 A | 7/1965 | Deibelbis | |
| 4,962,276 A | 10/1990 | Yan | |
| 5,306,859 A | 4/1994 | Eastman | |
| 5,384,040 A | 1/1995 | Mank | |
| 6,350,372 B1 | 2/2002 | Degnan | |
| 6,537,443 B1 | 3/2003 | Frankiewicz | |
| 6,685,824 B2 | 2/2004 | Frankiewicz | |
| 6,806,398 B2 | 10/2004 | Sakai | |
| 8,080,156 B2 | 12/2011 | Cross | |
| 2001/0050246 A1 | 12/2001 | Didillon | |
| 2005/0113468 A1* | 5/2005 | Fischer | C10G 2/32 518/726 |
| 2005/0167335 A1 | 8/2005 | Yamaguchi | |

(Continued)

OTHER PUBLICATIONS

Wilhelm, S.M. et al. (2006). Energy & fuels, 20, 180-186.*
Salvá et al (2010) SPE 138333.
Hollebone, B.R and C.X. Yang, "Mercury in Crude Oil Refined in Canada", Environment Canada, Ottawa, ON, 2007.

(Continued)

*Primary Examiner* — Brian McCaig
(74) *Attorney, Agent, or Firm* — Boulware & Valoir (57) ABSTRACT

Methods, systems and designs are provided for removing mercury from crudes. Crude oil is heated to a temperature above 100° C. in a stabilization column for a time sufficient to convert all of the forms of mercury in the oil into the elemental mercury form. The elemental mercury is then stripped from the crude oil by flashing, or preferably by gas stripping with a gas injected at the bottom of the column. Either process transfers the elemental mercury from the oil phase into the gas phase. Elemental mercury can then be removed from the gas phase by methods such as condensation, precipitation, or absorption either alone or in combination.

53 Claims, 7 Drawing Sheets

Values from Literature for Concentrations of Mercury in Crude Oil
(range shown by vertical; average, or recommended value indicated by circle)

(56) References Cited

U.S. PATENT DOCUMENTS

2012/0125820 A1   5/2012  Yean
2013/0306311 A1*  11/2013 Cooper .................. C10G 21/08
                                                166/267

OTHER PUBLICATIONS

International Search Report for analogous PCT application, PCT/US2014/051058. Dated Nov. 17, 2014.

* cited by examiner

Figure 1    Values from Literature for Concentrations of Mercury in Crude Oil
(range shown by vertical; average, or recommended value indicated by circle)

REMOVING MERCURY FROM CRUDE OIL USING A STABILIZER COLUMN

PRIOR RELATED APPLICATIONS

This invention claims priority to U.S. 61/892,035, filed on Oct. 17, 2013 and incorporated by reference in its entirety herein.

FEDERALLY SPONSORED RESEARCH STATEMENT

Not applicable.

FIELD OF THE DISCLOSURE

The disclosure generally relates to removing mercury from crude oils.

BACKGROUND OF THE DISCLOSURE

Coal is the largest source of human-generated mercury emissions in the United States. Coal-fired power plants release about 48 tons of mercury annually, according to EPA data. In contrast, the total amount of mercury in crude oil processed in the U.S. annually is less than five percent of the amount contained in the U.S. coal produced and consumed annually.

Figure 1:
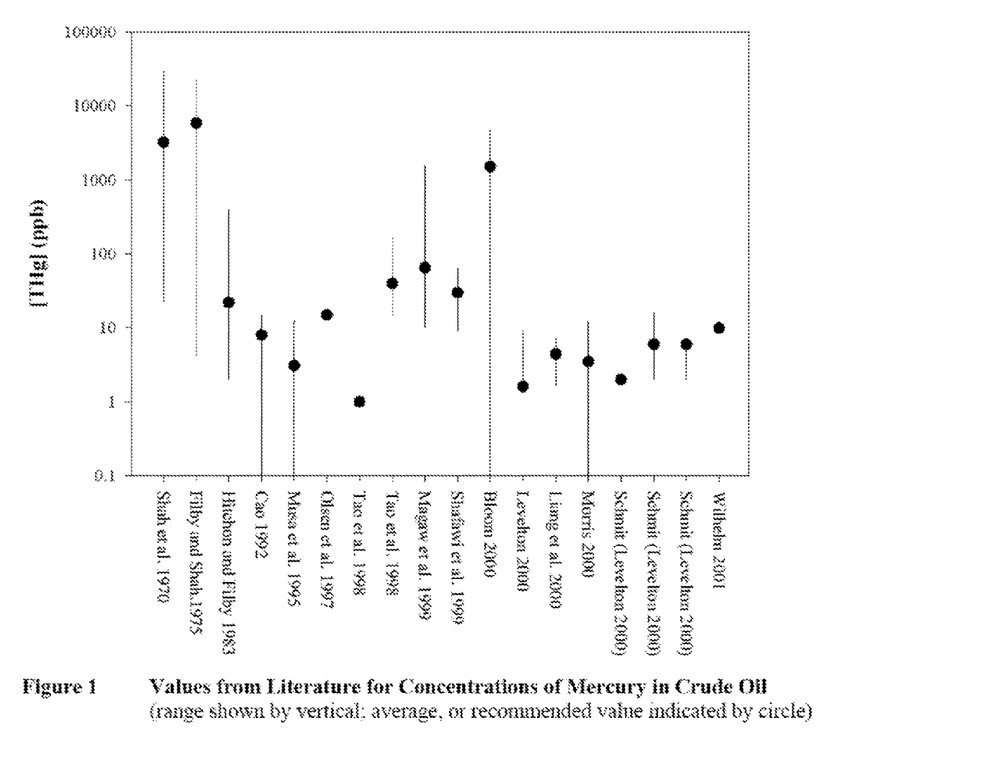
FIG. 1. Literature values of concentrations of mercury in crude oil, from Hollebone 2007.

Mercury concentrations in crude oil have been reported from as low as <1 ng/g to as high as 50,000 ng/g of oil (see e.g., FIG. 1). Some of the variability observed in crude oil mercury data is due to difficulties encountered in performing the analyses. A wide variety of measurement techniques, including neutron activation and many types of sample preparation systems, coupled with detectors as diverse as mass spectrometers, ICP/MS, atomic absorption, and atomic fluorescence have been used to perform these analyses. As such, it can be very difficult to compare mercury analysis results obtained in different laboratories using different analytical techniques. The handling of samples can also significantly affect the measured results. A recent study found that the number of times a sample bottle had been opened could significantly affect the measured mercury concentration.

Although analytical difficulties are responsible for some of the variability in crude oil mercury data, geological factors such as depositional environment and thermal history have an important influence on the concentrations of mercury that are observed in produced oils. The mercury concentrations shown in FIG. 1 vary by more than a factor of 1000, which is largely indicative of the wide variety of environments from which these oils originate.

Mercury has come under increasing scrutiny in recent years because its presence in oil creates problems throughout the production, transportation, storage and refining systems. These problems include environmental concerns, contamination of refinery products, catalyst poisoning, corrosion of equipment, health risks for personnel, as well as expenses for disposal of contaminated tank sludge, cleaning of contaminated equipment, shipping restrictions, etc. These issues have led companies to search for methods of reducing the mercury content of crude oil.

Several processes for removing mercury from crude oil have been disclosed in U.S. Pat. Nos. 6,350,372, 6,537,443, 6,685,824, and 6,806,398 and in an article by Salvá (2010). All of these processes essentially involve reacting the crude oil with a sulfur compound to precipitate HgS and then separating the HgS particles from the oil by filtration or another technique for solids removal. In some cases the process requires an additional filtration step prior to contacting the oil with the sulfur compound.

Such processes require the addition of reagent chemicals as well as filtration of the crude oil. The filtration step in particular is problematic because of filter plugging by other components in the crude oil such as waxes and sediments. The HgS will only comprise a small percentage of the total solids removed by filtration. The maintenance of a crude oil filtration unit can become cost prohibitive in terms of manpower, filtration media, and disposal.

The process disclosed in U.S. Pat. No. 8,080,156, in contrast, involves the use of natural gas to strip mercury from the crude oil. However, this process is only effective for the removal of elemental mercury. The efficiency of this process is thus limited by the ratio of elemental mercury to total mercury in the oil, and, in some cases, the efficiency of mercury removal can be very low.

ConocoPhillips advantageously invented a method of low temperature conversion of the mercury to elemental mercury and suggested gas stripping of same. However, that method could benefit from further improvements. See U.S. 61/783,817, filed on Mar. 14, 2013, incorporated by reference in its entirety.

Thus, what are needed in the art are even further improvements in methods of removing mercury from crude hydrocarbons.

SUMMARY OF THE DISCLOSURE

The disclosure utilizes the discovery that the thermal reduction of ionic mercury to elemental mercury can be carried out at moderate temperatures and within a commercially feasible timeframe in a crude oil matrix, and be converted to a gas phase. Elemental mercury can then be removed from the gas phase by methods such as condensation, precipitation, or absorption, either alone or in combination. Preferably, a crude oil stabilization column is used to perform this process because the temperature profile, residence time, column pressure, and internal gas generation can be optimized to achieve mercury removal as well as stabilization of the crude oil. Additional gas can also be added to the bottom of the stabilization column to enhance the mercury stripping efficiency.

Generally speaking, crude oil is heated to a temperature above 100° C. and held at that temperature for a specified period of time to convert all of the forms of mercury in the oil into the elemental mercury form. The rate of conversion to elemental mercury increases with temperature, and also varies with the profile of components in the crude.

A crude oil stabilizer column is essentially a distillation column in which light hydrocarbons (typically methane to butane) pass out of the top of the column in the vapor phase and the heavier hydrocarbons (typically pentane and heavier) pass out of the bottom of the column in the liquid phase. As the crude oil flows down the column through a series of trays, the oil temperature increases and ionic mercury is converted to elemental mercury. At 20° C., elemental mercury has a vapor pressure of 1.2 µm Hg, and thus at the higher temperatures at the bottom of the stabilization column, mercury will already be at least partially in the gas phase, and the conversion to a gaseous form can be assisted with stripping gas. Once gaseous, any of the known methods of removing and/or collecting the mercury can be used.

In more detail, the disclosure comprises one or more embodiments, in any combination thereof, described as follows:

One embodiment is a method of removing mercury from crude oil, comprising heating crude oil comprising mercury in various forms in a stabilization column to at least 100° C. and less than 350° C. until at least 95% of the mercury in various forms is converted to elemental mercury; converting the elemental mercury to gaseous elemental mercury; and removing the gaseous elemental mercury.

Preferably, the heating occurs for a time sufficient to convert at least 50% all mercury forms to elemental mercury. Preferably 60%, 70%, 80%, 90% 95%, 96%, 97%, 98%, 99% or nearly all of the mercury is converted. Preferred temperature ranges from 150-300° C., but can be higher if chemical changes to the crude are also desired.

During the travel through the column, the crude is stabilized as lighter hydrocarbons boil off and are removed from the top of the column. Additionally, most, if not all, of the mercury is converted to elemental mercury. Preferably, the converting step is by flashing or gas stripping, but any other method can be used. Most preferred, gas stripping by injection at the bottom of the stabilization column is used, and also preferred the stripping gas is recycled back to the column once the mercury is removed therefrom.

The removal of mercury from the stripping gas can be by any known in the art or to be developed in the future, and includes condensation, precipitation, or absorption, adsorption, and combinations thereof.

Preferred removal methods include removing mercury from said mercury rich gas stream by precipitation as HgS. Another method includes treating said mercury rich gas stream with an adsorption agent. Yet another method includes removing mercury from said mercury rich gas stream by precipitation as HgSe after contacting said mercury rich gas stream with a filter containing selenium.

Another embodiment is a method of removing mercury from crude oil, comprising heating crude oil comprising mercury in a stabilization column to at least 100° C. and less than 350° C. until at least 95% of the mercury in various forms is converted to elemental mercury; converting the elemental mercury to gaseous elemental mercury; and removing the gaseous elemental mercury.

Another improved method of removing mercury from crude oil comprises contacting a crude oil having mercury contaminants with a stripping gas to thereby form a treated crude oil and a mercury rich stripping gas stream, wherein the improvement comprises first passing a crude oil having mercury contaminants down through a stabilization column, thus heating the crude oil at 100-350° C. until 95% of said mercury contaminants are converted to elemental mercury, and injecting said stripping gas at the bottom of said stabilization column.

Another method of removing mercury from crude oil comprises passing crude oil comprising mercury down through a stabilization column; heating said crude oil comprising mercury in said stabilization column to at least 100° C. and less than 350° C. until at least 95% of the mercury in various forms is converted to elemental mercury; injecting a stripping gas at the bottom of said stabilization column to convert the elemental mercury to a gaseous elemental mercury and stripping gas mixture; and removing the gaseous elemental mercury from said gas mixture. Preferably, the stripping gas is recycled back into the system when mercury is removed therefrom.

Yet another method of removing mercury comprises heating crude oil comprising mercury in a stabilization column to between 200° C. and 250° C. for between 60 and 600 seconds, and removing mercury from the crude oil.

The total mercury content of the crude oil in such method can be reduced by 30 wt % or more, preferably reduced by 30-90 wt %, 40-90 wt %, 50-90 wt %. Preferably, said heating is at 230° C. to 240° C. and e.g., 120-600 seconds, 180-420 seconds, or 360-420 seconds.

Another variation includes prior to removing mercury from the crude, a step wherein the non-elemental mercury content of the crude is reduced by at least 50 wt %, optionally between 50-100 wt % and 100 wt %, 70-100 wt % or between 80-95 wt %.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention, such as instructions for use, buffers, vessels, and the like.

The following abbreviations are used herein:

| ABBREVIATION | TERM |
|---|---|
| ID-ICP-MS | isotope dilution inductively coupled plasma mass spectrometry |
| gpm/ft$^2$ | gallons per minute per square foot of cross sectional surface area |
| GC | Gas chromatography |
| Hg$^0$ | Elemental mercury |
| NGL | Natural gas liquids |
| MRU | Mercury removal unit |
| THF | Tetrahydrofuran |
| ICP-MS | Inductively-coupled plasma mass spectrometry |

DETAILED DESCRIPTION

The following description is intended to be illustrative only, and not unduly limit the scope of the appended claims. The present invention is exemplified with respect to crude oils. However, this is exemplary only, and the invention can be broadly applied to a variety of hydrocarbons or process streams.

This invention utilizes our discovery that in a crude oil matrix the thermal reduction of ionic mercury to elemental mercury can be carried out at moderate temperatures and within a commercially feasible time-frame.

A crude oil stabilization column can be used to perform this process because the temperature profile, residence time, column pressure, and internal gas generation can be optimized to achieve mercury removal as well as stabilization of the crude oil. This method is particularly beneficial, because this column is already used as a first treatment step in many plants, especially for refining of sour crudes containing sulfur. Thus, the process can be implemented with minimal capital expense or retrofitting. Additional gas can also be added to the bottom to the stabilization column to enhance the mercury stripping efficiency.

By incorporating mercury removal into an existing crude oil stabilization process, it is possible to realize a significant cost savings in terms of capital investment. By using existing equipment, the net present value of the project is also increased by shortening the time to commercial implementation. Other key advantages of the process disclosed here are: (1) the process is inherently simple and robust; (2) no reagent chemical addition is required; (3) no filtration is required; and (4) high removal efficiency is ensured by thermal conversion of non-volatile mercury species into the strippable elemental form of mercury.

Mercury Speciation in Crude Oil

Although speciation techniques are well developed for aqueous media, the technology for speciating mercury in crude oil is not as mature. The speciation and fractionation of mercury in crude oil is a particularly difficult task because of the low concentrations involved and because of the complexity of mercury chemistry.

This complexity is due in part to the fact that many of the mercury species can exist in multiple phases (gas, liquid, solid) simultaneously. For example, elemental mercury can be found in the headspace gas, dissolved in the crude oil, adsorbed to particulate matter, and as discrete droplets suspended in the oil.

The total concentration of mercury will be equal to the sum of the contributions from each of the various forms of mercury as shown below:

$$Hg_{total} = Hg^0 + Hg^{2+}_{complex} + Hg_{ads} + Hg_{other}$$

where:

$Hg_{total}$=the sum total of all the species of mercury $Hg^0$=elemental mercury (can exist in gaseous, liquid, or solid phases)

$Hg^{2+}_{complex}$=organically-complexed ionic mercury (mercury-thiols, etc.)

$Hg_{ads}$=mercury adsorbed to solid particles or metallic surfaces $Hg_{other}$=other forms of mercury not listed above Each of these species is characterized by a unique set of properties that define its toxicity, solubility, volatility, thermal stability, and reactivity. Further, is very likely that mercury speciation will change as the sample ages and this must be taken into account when interpreting the results of the analytical measurements.

In order to study the kinetics of mercury transformation reactions in crude oils, an accurate procedure is needed for determining the species of mercury that are present. The art is lacking an accurate mercury speciation procedure applicable to crude oil matrices. A mercury speciation procedure is described herein to fill this technology gap. The forms of mercury that can be determined using the procedure are $Hg^0$ (elemental mercury), $Hg(CH_3)_2$ (dimethyl mercury), $HgCH_3X$ (monomethyl mercury), and $Hg^{2+}$ (ionic mercury).

Briefly, to determine the mercury species present, samples of the crude oil being processed are spiked with isotopic mercury standards (e.g. $Hg^0$ and $Hg^{2+}$) before undergoing a derivatization process that will derivatize many forms of mercury and separating the derivatized mercury species based on their boiling points using a gas chromatograph (GC). As each mercury species exits the GC, its concentration is determined using an isotope dilution inductively coupled plasma mass spectrometer (ID-ICP-MS). This method is described using $^{199}Hg^0$ and $^{198}HgCl_2$ as the isotopic standards. However, other isotopic mercury standards such as HgO can be used.

This chemical derivatization method, described in more detail below, prevents thermal conversion of $Hg^{2+}$ during the GC separation of the species by converting $Hg^{2+}$ to diethyl mercury and converting monomethyl mercury into methylethyl mercury. $Hg^0$ and dimethyl mercury are not altered by the derivatization.

Preparation of Isotopically Enriched $Hg^0$ Standard: 20 mg of mercuric oxide (OAKRIDGE NATIONAL LABORATORY, USA) enriched in the 199 or 200 isotope is dissolved in 2 ml of concentrated hydrochloric acid (HCl) then diluted with water to a final HCl concentration of 20%. Approximately 0.5 g of stannous chloride [$SnCl_2$] is added to the solution, then stirred 4 hours until droplets of metallic Hg form. These $Hg^0$ droplets are washed three times with concentrated HCl. The acid washing is followed by water, methanol, and toluene washes. The $Hg^0$ droplets can be stored at room temperature in a borosilicate glass test tube in approximately 10 ml of ultrapure heptane to yield a saturated solution with approximately 800 ng/g of $^{199}Hg^0$ or $^{200}Hg^0$.

Preparation of Isotopically Enriched $Hg^{2+}$ Standard: 1 mg of mercuric oxide (OAKRIDGE NATIONAL LABORATORY, USA) enriched in the 198 or 201 isotope is dissolved in 1 ml of concentrated HCl. The solution is evaporated under a gentle stream of nitrogen at 90° C. to produce a dry mercuric chloride powder. The mercuric chloride powder is dissolved in 10 g of ultrapure toluene. This solution can be stored at −20° C. in a borosilicate glass test tube. The final concentration of the $^{198}Hg^{2+}$ or $^{201}Hg^{2+}$ in these standards can be determined by reverse isotope dilution, using a toluene solution of natural isotopic abundance $HgCl_2$ ($HgCl_2$ 99.999%, SIGMA ALDRICH).

Preparation of Crude Oil Samples: Crude oil samples are prepared for speciation analysis by accurately weighing approximately 0.1 g of crude oil into a 2 ml borosilicate glass GC vial. These vials are sealed using commercially available GC crimp caps and red rubber/PTFE septa.

Approximately 5-8 mg each of the $^{199}$Hg$^0$ and $^{198}$HgCl$_2$ standard solutions are added to the samples via injection through the septa using 10 µl gas-tight syringes. Dedicated syringes are used for each of the isotope standard solutions to prevent cross-contamination.

The added masses of the isotope standards are measured gravimetrically using a 5-decimal place analytical balance. The isotopic mercury standards are mixed with the crude oil solution by manually swirling the GC vials in a circular motion. The solution is allowed to equilibrate for 30 minutes before derivatization.

Derivatization: The crude oil samples with the isotope standards (isotopically spiked samples) are derivatized using a procedure optimized to minimize unwanted Hg species redistribution reactions. 10 µl of 2M ethylmagnesium chloride (EtMgCl) in THF is injected through the GC vial septum using a gas-tight syringe, followed by 0.5-1 ml of ultrapure heptane using a 2 ml disposable syringe fitted with a 20 mm 27 gauge needle. The heptane lowers the solution viscosity to facilitate the derivatization reaction between the EtMgCl and mercury components in the crude oil. The samples are then derivatized at 0° C. for 20 minutes before GC/ICP-MS analysis.

Using this mercury speciation method, it was determined that crude oils contain two basic forms of mercury: elemental mercury)(Hg$^0$ and ionic mercury (Hg$^{2+}$). Ionic mercury is very soluble in crude oils and is a non-volatile form of mercury. Elemental mercury, in contrast, is less soluble and more volatile. This has important implications for the design of processes to remove mercury from crude oil because it affects the reaction rate expression. Based on this knowledge of mercury speciation in crude oil, we then developed a process for removing mercury from crude oils.

Converting Mercury Forms to Elemental Mercury

In crude oil, the elemental mercury redox equilibrium, Hg$^0$ ↔ Hg$^{2+}$+2e$^-$, is shifted towards the oxidized state (Hg$^{2+}$+2e$^-$) at temperatures below 100° C. The equilibrium begins to shift towards the reduced state at temperatures above 100° C. Although the Hg$^{2+}$ reduction rate is too small at 100° C. to be commercially useful, the conversion to Hg$^0$ will be complete in a petroleum reservoir at that temperature because of the geologic timescale that applies to that environment (>10 million years). As such, the mercury concentration and speciation in wellhead crude oil is a function of reservoir geology and temperature.

Additionally, mercury speciation undergoes predictable changes as the physical and chemical conditions change during oil production and transport. In crude oil reservoirs at temperatures above 100° C., mercury is present only as Hg$^0$. After the crude is extracted from the reservoir and its temperature falls below 100° C., the spontaneous oxidation of Hg$^0$ to Hg$^{2+}$ will occur.

Hg$^{2+}$ is very soluble in crude oils and is a non-volatile form of mercury, making its removal more difficult. Thus, preheating oils to at least 100° C. will convert Hg$^{2+}$ to Hg$^0$, and simplify extraction because processes to remove elemental mercury already exist.

For example, U.S. Pat. Nos. 4,962,276 and 8,080,156 disclose processes that employ gas stripping to remove mercury from condensates and crude oils. These processes, however, only work if the mercury is in the gas strippable elemental form. As noted above, a significant portion of the mercury in a crude oil can be present in the non-volatile ionic form. The non-volatile ionic mercury cannot be removed from a crude oil by gas stripping. Each of these methods can be used however, if proceeded by the preheat stage described herein, which converts various forms of mercury to elemental mercury.

U.S. Pat. No. 5,384,040 discloses a catalytic process for transforming mercury compounds contained in a gas condensate liquid into elemental mercury. Although not the preferred embodiment, a non-catalytic heat treatment process in the absence of hydrogen is also disclosed. The elemental mercury formed by the catalytic process is removed from the gas condensate liquid using a solid phase sorbent.

In this disclosure, a process is described for converting the various forms of mercury in a crude oil to the elemental form so that the mercury can be subsequently removed from the oil by gas stripping.

Figure 2:
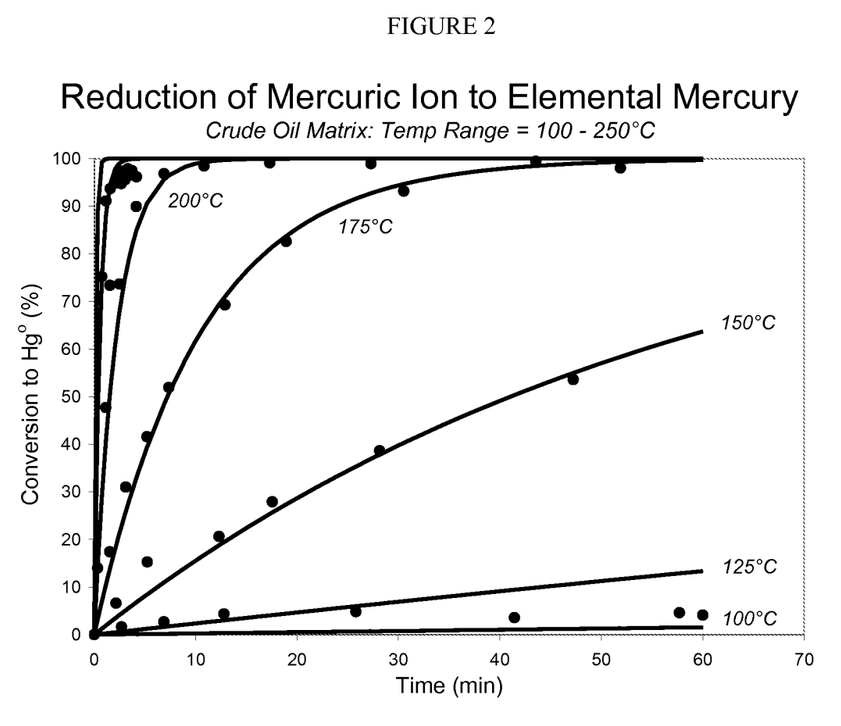
FIG. 2. Reduction of mercuric ion to elemental mercury with time at seven different temperatures (100-250° C., in 25° C. increments) in a crude oil matrix.

In such process, crude oil is heated to a temperature above 100° C. and held at that temperature for a specified period of time to convert all of the forms of mercury in the oil into the elemental mercury form. As shown in FIG. 2, the rate of conversion to elemental mercury increases with temperature, and the temperature should not be lower than 100° C.

The amount of mercury removed from the oil can be controlled by adjusting the temperature and/or the length of time that the oil is held at a specified temperature per FIG. 2. However, the temperature preferably does not exceed the decomposition temperature of the hydrocarbon, although in some embodiments some upgrading can occur.

The rate at which mercury is thermally reduced to elemental mercury is also strongly influenced by the composition of the crude oil. Therefore, for process design purposes, it is important to experimentally determine the kinetics of the mercury reduction reaction for the specific oil feed to the process.

Kinetic data for the mercury reduction reaction are obtained by spiking the oil with an enriched stable isotope of ionic mercury (e.g. $^{198}$Hg$^{2+}$ or $^{201}$Hg$^{2+}$). To accomplish this, an enriched isotope, in the form of HgCl$_2$ or HgO for example, is dissolved in the oil and the rate of conversion of this ionic mercury standard to elemental mercury is monitored as a function of time and temperature. The use of an enriched isotope allows the reduction reaction to be monitored accurately even though naturally-occurring mercury may also be present in the oil.

Rapid, time-resolved sampling is essential for building the accurate kinetic models that are needed for designing mercury removal processes. The kinetic data shown in FIG. 2 was produced using a stirred high-pressure batch reactor that allows rapid sampling of the crude oil during a reduction experiment.

The conversion of Hg$^{2+}$ to Hg$^0$ was monitored using enriched isotopic tracers and the mercury speciation procedure described above.

The results of the kinetic measurements can be used to define a reaction rate expression for a specific oil that might have a form such as:

$$[Hg^{2+}]_t = [Hg^{2+}]_i e^{-kt}$$

$$k = Ae^{-Ea/Rt}$$

where: k=apparent first-order rate constant; t=time; $[Hg^{2+}]_i$= concentration of ionic mercury at time zero; $[Hg^{2+}]_t$=concentration of ionic mercury at time t; $Ae^{-Ea/RT}$ is the Arrhenius equation used to calculate the effect of temperature (T) on the reaction rate constant.

The solid lines in FIG. 2 represent the kinetic behavior predicted using the Arrhenius parameters of the above equations for the specific crude oil that was used in the experiments.

The kinetics, fluid flow and heat transfer of a process are most important when upscaling for large-scale designs. To retain the same reaction rate, the other variables in the process design must be decreased or increased as necessary. For instance, increasing vessel sizes could decrease the rate, such that the temperature of the conversion must be increased to return the rate to its original value. Alternatively, increasing temperature increases the amount and rate of mercury conversion (see FIG. 2). However, a balance must be struck to prevent thermal degradation of other components in the crude oil or destruction of processing equipment. Thus, the above reaction rate expression and the Arrhenius equation are used to calculate process design specifications such as process temperature, vessel sizes, oil feed rate, oil recycle rate, etc.

The process temperature for the ionic mercury reduction step should be in the range of 100-350° C. More preferably the process temperature should be in the range of 100-300° C. Most preferably the process temperature should be in the range of 150-300° C. This temperature range is compatible with standard crude oil processing equipment, such as the stabilization units that are used in NGL extraction. The optimum process temperature will vary based on the composition of the oil and the desired reaction rate.

Stabilization Column

Figure 3:
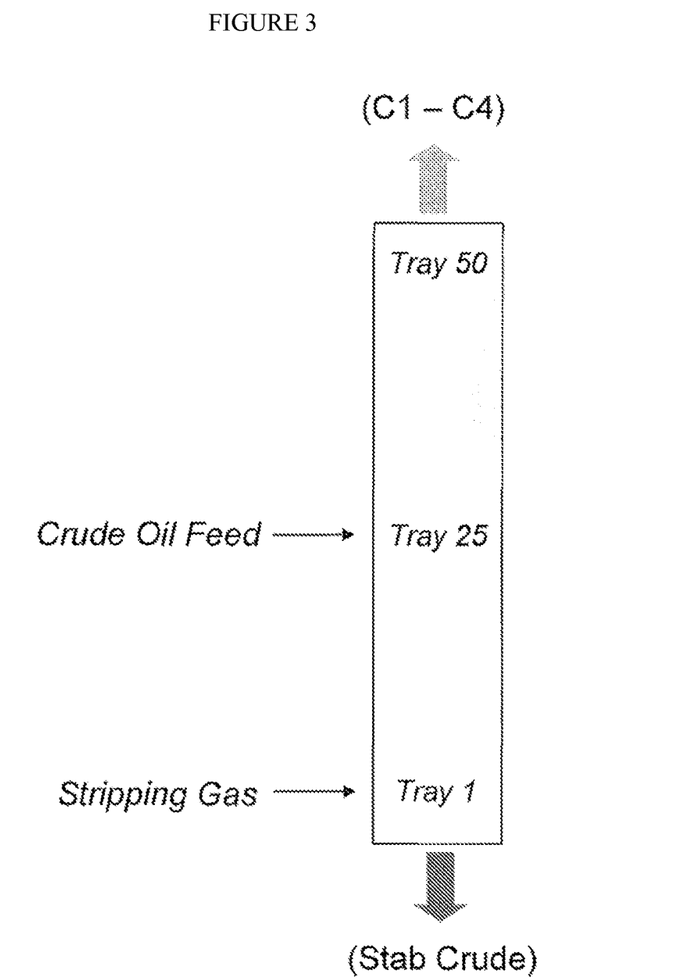
FIG. 3. Schematic of Stabilizer Column.

FIG. 3 shows a simple schematic of a crude oil stabilization column, in this instance having 50 trays. Crude oil is fed in approximately midway where it is heated and cascaded through a series of bubble trays spaced throughout a column. The hydrogen sulfide (if any) and remaining light hydrocarbons boil off in this process and are collected at the top of the column, while the sweetened heavy crude is drawn off from the bottom. As the oil progresses down the column, the mercury converts to elemental mercury, as demonstrated in FIG. 4 discussed below, and can then be stripped with a stripping gas injected at the bottom of the stabilizer column.

Figure 4:
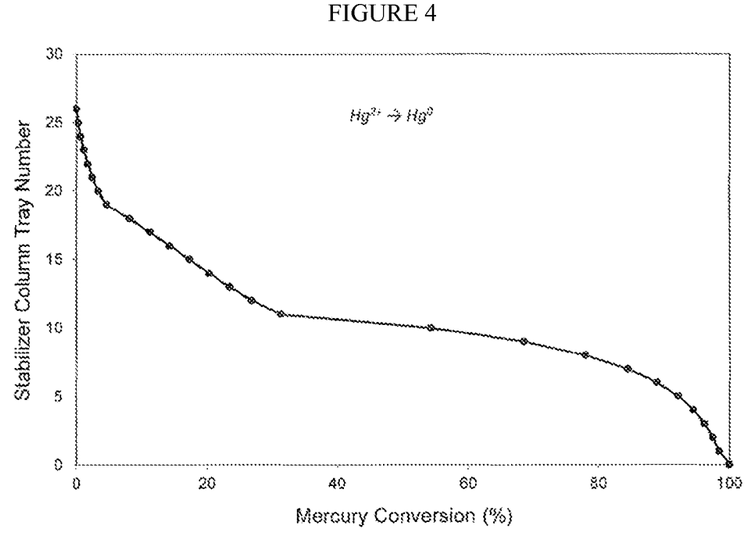
FIG. 4. is a graph of stabilizer column tray number versus % mercury conversion to elemental mercury. It shows the progressive conversion to elemental mercury that occurs as the crude oil flows down the stabilizer column.

FIG. 4 demonstrates the progressive conversion to elemental mercury that occurs as the crude oil flows down the stabilizer column. The percent conversion to elemental mercury is calculated using the reaction rate expression described above with reaction times and temperatures obtained from the oil residence time on each tray and the temperature of each tray.

As can be seen in FIG. 4, mercury will be most strippable near the base of the stabilizer column where the conversion to elemental mercury is the highest. Any process change that increases the gas flow across the lowermost trays will therefore increase the stripping of elemental mercury from the oil.

The gas flow in the stabilizer column can be increased by decreasing the operating pressure or increasing the operating temperature. The largest increase in gas flow can be achieved by decreasing the operating pressure and increasing the operating temperature at the same time. The degree to which these process changes can be implemented will be determined by the operational limits of the stabilization unit and the specification requirements for the NGL and stabilized crude oil products.

Elemental mercury can then be removed from the gas phase by methods such as condensation, precipitation, amalgamation, adsorption, or absorption alone or in combination. If desired, some or all of the stripping gas can be recycled back into the process. The mercury-free crude is drawn off from the bottom, cooled and stored.

Figure 5:
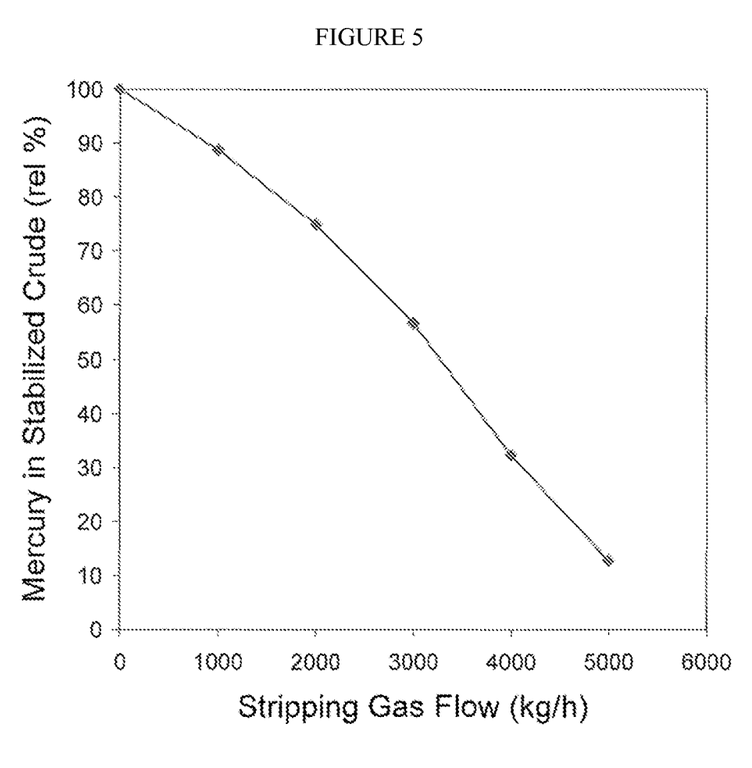
FIG. 5. is a graph of relative % mercury in stabilized crude versus gas flow of stripping gas injected at the bottom of the stabilizer column.

FIG. 5 illustrates the extent that the mercury concentration in stabilized crude oil can be reduced by injecting gas at the base of the stabilizer column. The gas injected into the column can be selected from the group including methane, ethane, propane, and butane. More preferably the injection gas should be selected from the group propane and butane. Most preferably the injection gas should be butane.

Process Flow Variations

Figure 6A:
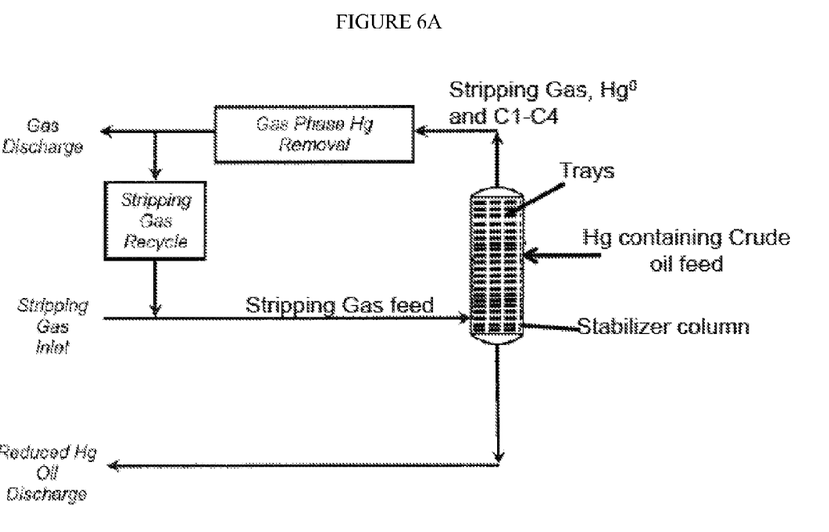
FIG. 6A. Schematic of a process for removal of mercury from crude oil using a stripping gas.

A block flow diagram of the disclosed process is shown in FIG. 6A. The crude oil is introduced into a stabilizer column at approximately the middle of the column. The crude oil then flows down the stabilizer column through a series of trays. As it cascades downward through the trays, the oil increases in temperature, thus converting ionic mercury species in the crude oil to elemental mercury. As shown in FIG. 6A, a stripping gas is simultaneously introduced into the stabilizer column at the bottom. Any gas, such as nitrogen, methane, ethane, propane, butane, natural gas, NGL, naptha, or combinations thereof can be used.

The stripping gas flows upward through the oil. As the stripping gas contacts the crude oil, the elemental mercury is removed in the form of mercury gas and, along with the stripping gas and light hydrocarbons, flows upward. The stripping gas plus mercury vapor is drawn from the top of the vessel and passed through a mercury removal unit, wherein the mercury can be removed from the stripping gas using an adsorption method (filter or scrubber). Alternatively, mercury can be removed from the stripping gas via precipitation with a filter containing selenium or a gas containing hydrogen sulfide. Elemental mercury can also be removed by methods such as condensation, amalgamation, absorption or a combination of any of the methods mentioned thus far.

The mercury-free stripping gas can then be recycled. The light hydrocarbons can be used as stripping gas or can be separated from the stripping gas (not shown). The stripped crude oil will be discharged for further processing.

The stripping gas utilized in the process may be any of a number of gases including, for example, $N_2$, $CO_2$, $H_2$, or natural gas. Natural gas may be preferred for the removal of mercury from hydrocarbon condensate because of its availability and due to the fact that it may be recovered as the product subsequent to purification. Alternatively, ethane, propane, butane, NGL, naptha, and the like, may be preferred as also readily available.

A mercury adsorber or a scrubber is used to treat the stripping gas after it exits the stripper. The adsorber may include a fixed bed of active solid adsorbents such as sulfur/carbon, Ag/carbon, Ag/$Al_2O_3$, CuS/$Al_2O_3$, CuS/carbon, FeS/$Al_2O_3$, FeS/carbon or Bi/$Al_2O_3$, and the like. The adsorber should be sufficiently large to remove ninety percent of the mercury from the stripping gas. Typical superficial gas velocity through the bed should be between 0.1-50 ft/s and preferably one half to ten feet per second. Depending upon the nature and activity of the adsorbent, the temperature should be maintained at 50-400° F.

A polysulfide scrubbing system may alternatively be used to remove mercury from the stripping gas. The mercury-containing stripping gas is passed through a scrubbing tower where it is scrubbed with a dilute alkali solution of $Na_2S_x$. The tower is preferably packed with structural packing, although a bubble cup or sieve tray could also be employed.

Other known processes may be used to adsorb mercury vapor from the stripping gas. U.S. Pat. No. 3,194,629 discloses one such process.

Figure 6B:
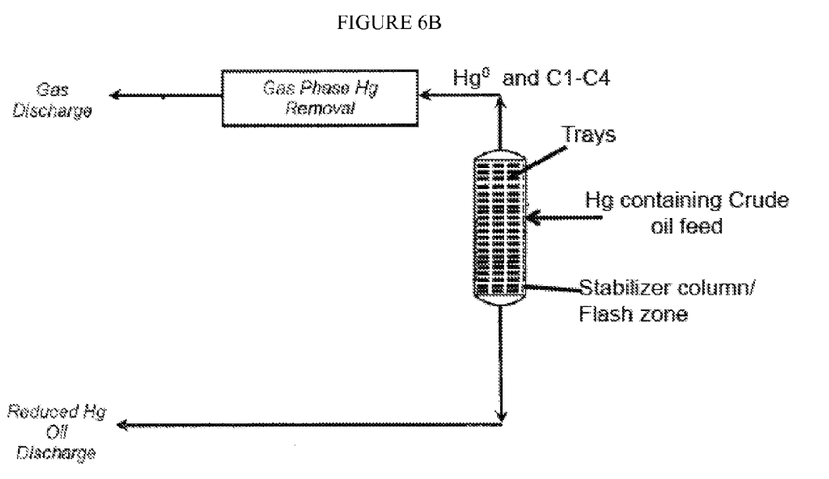
FIG. 6B. Schematic of a process for removal of mercury from crude oil.

FIG. 6B is a block flow diagram of one embodiment of the disclosed process in which no stripping gas is removed. The crude oil is introduced into a stabilizer column at approximately the middle of the column. The crude oil then flows down the stabilizer column through a series of trays. As it cascades downward through the trays, the oil increases in temperature, thus converting ionic mercury species in the crude oil to elemental mercury. The elemental mercury is removed from the crude oil via a flash process to transfer the elemental mercury to the gas phase. A gaseous stream of light hydrocarbons and elemental mercury are then removed from the top of the stabilization column. The mercury is removed from the gas phase by one of the processes described above.

Figure 7:
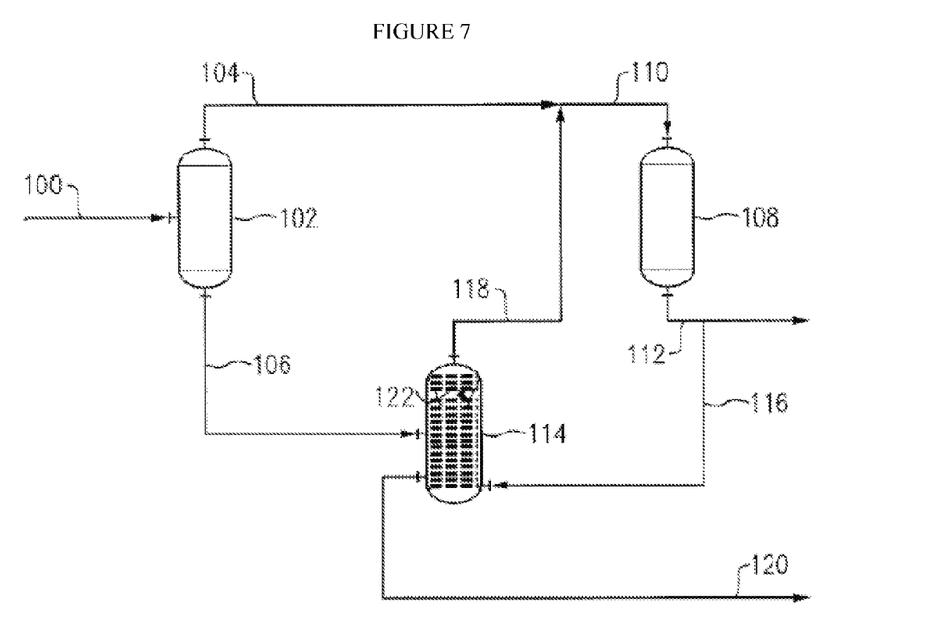
FIG. 7. Simplified schematic flow diagram of an assembly for removing mercury from crude oil, according to one embodiment.

FIG. 7 (adapted from U.S. Pat. No. 8,080,156) illustrates a system in which crude oil is sent by line 100 and is passed to a separator 102 for separation into a gaseous hydrocarbon stream comprising, consisting of, or consisting essentially of hydrocarbons, elemental mercury and water, which is removed from the separator 102 by line 104, and into a liquid hydrocarbon stream: 1) comprising, consisting of, or consisting essentially of hydrocarbons and elemental mercury, or 2) comprising, consisting of, or consisting essentially of hydrocarbons, elemental mercury and water, which is removed from the separator 102 by line 106.

A mercury-containing gas feed, including in part at least a portion of the gaseous hydrocarbon stream, is charged to a mercury removal unit (MRU) 108 by line 110 for removal of mercury from the mercury-containing gas feed, thereby forming a treated gas stream, which is removed from the MRU 108 by line 112. A recycle gas stream comprising a portion of the treated gas stream from the line 112 is charged to a stabilizer column 114 by line 116 for contact with at least a portion of the liquid hydrocarbon stream charged to the contactor 114 by the line 106. The liquid hydrocarbon stream flows downward through the trays 122, increases in heat such that ionic mercury is converted into elemental mercury, and contacts with the recycled gas stream. Through such contacting, at least a portion of the elemental mercury contained in the liquid hydrocarbon stream is transferred to the recycle gas stream, thereby forming a mercury rich gas stream, which is removed from the stabilizer column 114 by line 118, and a treated liquid hydrocarbon stream, which is removed from the stabilizer column 114 by line 120. The mercury rich gas stream is passed to the MRU 108 as a portion of the mercury-containing gas feed by the lines 118 and 110.

For some embodiments, the stabilizer column 114 includes multiple (e.g., 2, 4, 6 or more) trays 122 (depicted by "X" within the contactor 114) of separation between vapor and liquid phases. Either trays or packing material in a flow path of fluids described herein passing through the stabilizer column 114 may form the theoretical stages 122. For example, the packing material disposed inside of the stabilizer column 114 to define the trays 122 may include random oriented objects or a shaped structure and may be made of metallic or ceramic solid material. In some embodiments, amount of the packing material utilized depends on a desired number of the trays 122 provided by the packing material.

Figure 8:
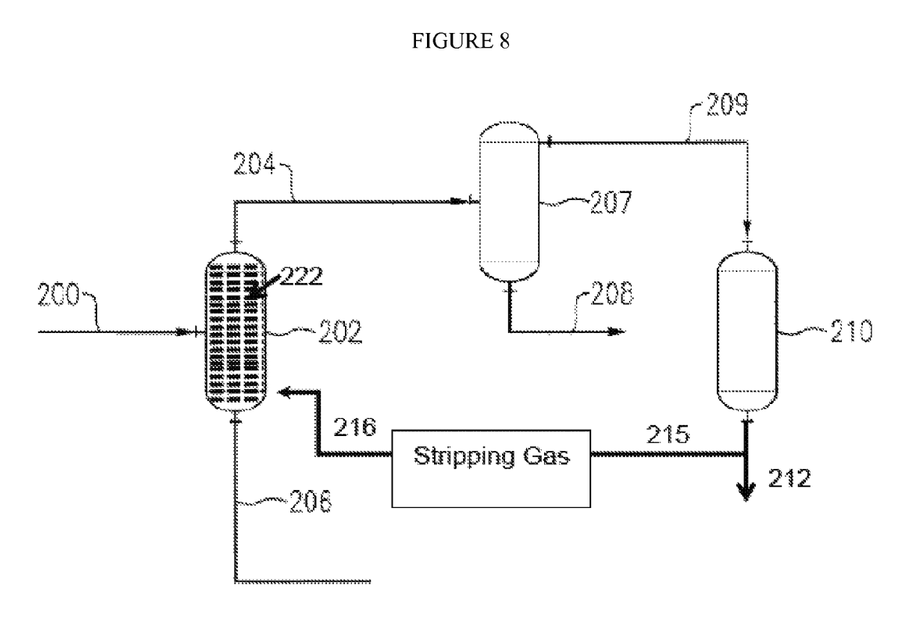
FIG. 8. Simplified schematic flow diagram of another assembly for removing mercury from crude oil, according to another embodiment.

FIG. 8 (adapted from U.S. Pat. No. 8,080,156) shows a system in which crude oil is passed by line 200 to a column stabilizer 202. As the crude oil flows down the trays 222, the oil increases in temperature. The ionic mercury species in the heated crude oil then converts to elemental mercury. As the crude oil is flowing downward, stripping gas 216 is introduced into the column stabilizer 202 near the bottom. The stripping gas flows upward contacting the oil. As the stripping gas contacts the crude oil, the elemental mercury is removed in the form of mercury gas and flows upward along with the stripping gas, light hydrocarbons and water. The mercury rich stream is removed from the stabilizer column 202 by line 204. The mercury free crude oil is discharged from the stabilizer column through line 206.

The gaseous mercury rich stream is charged to a first separator 207 wherein water is removed and exits the second separator 207 by line 208. Overhead gases leaving the second separator 207 by line 209 are charged to a mercury removal unit (MRU) 210 as a mercury-containing gas feed for removal of mercury from the mercury-containing gas feed, thereby forming a treated gas stream, which is removed from the MRU 210 by line 212. A recycle gas stream 215 comprising a portion of the treated gas stream from line 212 can be used to make up stripping gas 216.

EXPERIMENTAL

Bench-scale mercury stripping was performed on stabilized oil and incoming oil to give an indication of the extent of conversion of ionic to elemental mercury in the stabilizing column under adjusted operating conditions for conversion of mercury. The conditions for the stabilizer column are given in Table 1.

TABLE 1

Experimental Conditions for Stabilizer Column

| Parameter | Normal Conditions | Optimum Conditions for Mercury Removal |
|---|---|---|
| Oil Feed Rate* | 600-700 m³/hr at current rates | 550 m³/hr |
| Operating Pressure | ~9 barg | 8.5 barg |
| Bottoms Temperature | 225-230° C. | 230° C. |

*The feed-rate for mercury removal is low to maximize residence time in the column Stabilized Oil: The initial mercury concentrations in the stabilized oil ranged from 23-60 ppb. Approximately 90% was removed in the stripper. Since the stripper only removes elemental mercury, this demonstrates that at least 90%, probably more, of the mercury in the stabilized stream had been converted to elemental.

Incoming Oil: For comparison, the strippability of mercury in incoming crude oil was also examined. The incoming oil contained an average of 55% strippable mercury. Approximately 60% was removed in the stripper under the same conditions which achieved 90% removal of mercury from the stabilized stream.

The increase in strippable mercury from 55% to 90% that occurs during the stabilization process demonstrates the effectiveness of the stabilizer columns in converting mercury to the volatile elemental form. Because no effect was observed due to the initial mercury concentration on the stripping efficiency, this also suggests that the stabilizer columns are effectively converting the non-strippable ionic mercury into the strippable elemental form.

It should be emphasized that even a small difference in mercury removal can be very significant. This is especially important when new oil with an expected high mercury concentration is blended with other low-mercury oil streams such there is a slight increase in mercury content overall, but enough of an increase to cause the blended streams to be outside of spec limits. Thus, a small reduction in mercury would make a big difference.

The following references are incorporated by reference in their entirety for all purposes.

Salvá et al (2010) SPE 138333.

Hollebone, B. P. and C. X. Yang, "Mercury in Crude Oil Refined in Canada", Environment Canada, Ottawa, ON, 2007.

U.S. Pat. Nos. 3,194,629, 4,962,276, 5,384,040, 6,350,372, 6,537,443, 6,685,824, 6,806,398, 8,080,156

U.S. 61/783,817, filed on Mar. 14, 2013.

The invention claimed is:

1. A method of removing mercury from crude oil having various forms of mercury, comprising
    a) feeding a crude oil comprising various forms of mercury into a stabilization column at a predetermined flow rate;
    b) heating said crude oil comprising mercury for a first time period in said stabilization column to at least 100° C. and less than 350° C. until at least 70 wt % of the various forms of mercury are converted to elemental mercury;
    c) converting the elemental mercury to gaseous elemental mercury; and
    d) removing the gaseous elemental mercury.

2. The method of claim 1, wherein at least 80 wt % of the mercury is converted to elemental mercury.

3. The method of claim 1, where said converting step c) is by gas stripping.

4. The method of claim 3, where said gas stripping is by injecting a stripping gas at the bottom of said stabilization column.

5. The method of claim 3, where said stripping gas is methane, ethane, propane, butane, or mixtures thereof.

6. The method of claim 3, where said stripping gas is butane.

7. The method of claim 3, where said stripping gas is recycled back to said stabilization column after mercury is removed therefrom.

8. The method of claim 1, where said converting step c) is by flashing.

9. The method of claim 1, wherein said heating is at 100° C.-300° C.

10. The method of claim 1, wherein said heating is at 150° C.-300° C.

11. The method of claim 1, wherein said heating is at 200° C.-250° C.

12. The method of claim 1, wherein said heating is at 230° C. to 240° C.

13. The method of claim 1, wherein said time period is at least 60 seconds.

14. The method of claim 1, wherein said time period is from 120 to 600 seconds.

15. The method of claim 1, wherein said time period is from 180 and 420 seconds.

16. The method of claim 1, wherein said time period is from 360 and 420 seconds.

17. The method of claim 1, wherein said predetermined flow rate is between 500 m$^3$/hour and 700 m$^3$/hour.

18. The method of claim 1, wherein said predetermined flow rate is between 500 m$^3$/hour and 600 m$^3$/hour.

19. The method of claim 1, wherein said predetermined flow rate is between 540 and 560 m$^3$/hour.

20. The method of claim 1, where said removing step is by condensation, precipitation, or absorption, adsorption, or combinations thereof.

21. The method of claim 1, wherein at least 90 wt % of the mercury is converted to elemental mercury.

22. The method of claim 1, wherein at least 95 wt % of the mercury is converted to elemental mercury.

23. An improved method of removing mercury from crude oil, the method comprising contacting a crude oil having mercury contaminants with a stripping gas to thereby form a treated crude oil and a mercury rich stripping gas stream, wherein the improvement comprises first passing a crude oil having mercury contaminants down through a stabilization column, thus heating the crude oil at 100-350° C. until from 70 wt % to 100 wt % of said mercury contaminants are converted to elemental mercury, and injecting said stripping gas at the bottom of said stabilization column.

24. The improved method of claim 23, wherein 80 wt % to 100 wt % of said mercury contaminants is converted to elemental mercury.

25. The improved method of claim 23, wherein 90 wt % to 100 wt % of said mercury contaminants is converted to elemental mercury.

26. The improved method of claim 23, wherein said stripping gas is methane, ethane, propane, butane, fuel gas, or natural gas.

27. The improved method of claim 23, further comprising removing mercury from said mercury rich stripping gas stream.

28. The improved method of claim 23, further comprising removing mercury from said mercury rich stripping gas stream by precipitation as HgS, wherein said gas stream contains hydrogen sulfide.

29. The improved method of claim 23, further comprising removing mercury from said mercury rich stripping gas stream by precipitation as HgO.

30. The improved method of claim 23, further comprising treating said mercury rich stripping gas stream with an adsorption agent.

31. The improved method of claim 23, further comprising removing mercury from said mercury rich gas stream by precipitate as HgSe after contacting said mercury rich stripping gas stream with a filter containing selenium.

32. A method of removing mercury from crude oil, comprising
    a) passing crude oil comprising mercury in various forms down through a stabilization column;
    b) heating said crude oil comprising mercury in said stabilization column to at least 100° C. and less than 350° C. until from 70 wt % to 100 wt % of the mercury in various forms is converted to elemental mercury;
    c) injecting a stripping gas at the bottom of said stabilization column to convert the elemental mercury to a gaseous mercury and stripping gas mixture; and
    d) removing the gaseous mercury from said gas mixture.

33. The improved method of claim 32, wherein 80 wt % to 100 wt % of said mercury contaminants is converted to elemental mercury.

34. The improved method of claim 32, wherein 90 wt % to 100 wt % of said mercury contaminants is converted to elemental mercury.

35. The method of claim 32, wherein said stripping gas is C2-C4 hydrocarbons or mixtures thereof.

36. The method of claim 32, wherein said stripping gas is butane.

37. The method of claim 32, wherein said stripping gas is recycled back to the stabilization column after step d.

38. The method of claim 32 wherein, prior to removing mercury from the crude, the non-elemental mercury content of the crude is reduced by at least 50 wt %.

39. A method of removing mercury from crude oil, comprising:
 a) heating crude oil comprising various forms of mercury in a stabilization column to at least 100° C. and less than 350° C. to convert 70 to 100 wt % of the various forms of mercury into elemental mercury;
 b) injecting a stripping gas into the base of said stabilization column; and
 c) removing gaseous elemental mercury.

40. The method of claim 39, where said stripping gas is methane, ethane, propane, butane, or mixtures thereof.

41. The method of claim 39, where said stripping gas is butane.

42. The method of claim 39, where said stripping gas is recycled back to said stabilization column after mercury is removed therefrom.

43. The method of claim 39, wherein said heating is at 200° C.-250° C.

44. The method of claim 39, wherein said heating is at 230° C. to 240° C.

45. A method of removing mercury from crude oil, comprising
 a) heating crude oil comprising various forms of mercury in a stabilization column to between 200° C. and 250° C. for between 60 and 600 seconds to convert 70 to 100 wt % of the various forms of mercury to elemental mercury and
 b) removing elemental mercury from the crude oil.

46. The method of claim 45, wherein the total mercury content of the crude oil is reduced by 30 wt % or more.

47. The method of claim 45, wherein the total mercury content of the crude oil is reduced by 30 wt % and 90 wt %.

48. The method of claim 45, wherein the total mercury content of the crude oil is reduced by 40 wt % and 90 wt.

49. The method of claim 45, wherein the total mercury content of the crude oil is reduced by 50 wt % and 90 wt %.

50. The method of claim 45, wherein said heating is at 230° C. to 240° C.

51. The method of claim 45, wherein said time period is from 120 to 600 seconds.

52. The method of claim 45, wherein said time period is from 180 and 420 seconds.

53. The method of claim 45, wherein said time period is from 360 and 420 seconds.

* * * * *